Patented Mar. 9, 1954

2,671,755

UNITED STATES PATENT OFFICE 2,671,755

TREATMENT OF WATER WITH CALCIUM CHLORIDE FLUORIDE

Raymond J. Anderson, Midland, Mich., assignor to The Dow Chemical Company, Midland, Mich., a corporation of Delaware No Drawing. Application August 5, 1949, Serial No. 108,851

3 Claims. (Cl. 210—23)

This invention relates to a new method of introducing fluoride into potable water.

Because of the known value of fluorides in decreasing tooth decay, a number of smaller cities are now adding fluoride to the public drinking water supply. In the usual waterworks procedure, sodium fluoride is dissolved in a limited amount of water and the resulting solution is mixed into the main stream of water to provide a controlled fluoride ion concentration of one to two parts per million.

Sodium fluoride is at present the only fluoride used for this purpose. However, it is expensive, and the supply is limited. If several of the larger cities were to adopt the sodium fluoride treatment, a serious supply problem would develop.

Calcium fluoride, though available in large tonnage as the mineral fluorspar, has very limited solubility in water, only 16 parts per million. It is also slow in dissolving even to this extent. In addition, even when ground very fine, it sediments so rapidly that it is difficult to mix into large volumes of water. Hence, while calcium fluoride should theoretically be usable in water treatment, there has been no known practical method of introducing it into a large stream of water in uniform controlled dosage.

It has now been found, however, that the little known compound calcium chloride fluoride, which may be easily and cheaply produced from calcium fluoride, affords a ready means for the introduction of fluoride ion into large streams of water in easily controllable proportions. The present invention is based on this finding.

Calcium chloride fluoride ($CaClF$, sometimes written $CaCl_2 \cdot CaF_2$) is a colorless crystalline solid of well-defined characteristics (Defasqz, Ann. Chim. phys. (8) 1, 355 (1904); Plato, Z. phys. Chem. 58, 361–4 (1907)). It is conveniently prepared by heating together equimolar proportions of calcium chloride and calcium fluoride at a temperature sufficient to cause interfusion, ordinarily at 800° to 850° C. Under these conditions, reaction occurs rapidly according to the equation $$CaCl_2 + CaF_2 \rightarrow 2CaClF$$

The fusion product may be solidified by cooling and then ground to a powder, or it may be converted into flake form by the rotary drum technique. In either case the compound is sensitive to moisture and should be stored in sealed containers until use.

When finely divided calcium chloride fluoride is added to water, it decomposes almost immediately, reverting to calcium chloride and calcium fluoride. The calcium fluoride thus regenerated is in form of a gelatinous suspension which remains dispersed in the water for a considerable period. Unlike crystalline calcium fluoride, the gelatinous material, when added to a further volume of water, dissolves very rapidly up to its solubility limit. Moreover, this limit is significantly higher than that of the crystalline compound, being about 40 parts per million. These properties allow the calcium chloride fluoride to be used as a water-treating agent by essentially the same simple techniques heretofore used only with sodium fluoride.

In adding fluoride to potable water according to the invention in its simplest aspect, the calcium chloride fluoride is dispersed throughout the water in a proportion just sufficient to produce the desired fluoride ion concentration. For a fluoride ion concentration of two parts per million, about the highest value permissible in controlling tooth decay, roughly ten parts per million of the calcium chloride fluoride should be added. At this concentration, reversion of the added compound to calcium chloride and calcium fluoride is instant and complete, and both reversion products stay fully dissolved in the water.

In waterworks practice, it is preferable, for accurate control of fluoride concentration, to form a liquid preconcentrate and add this into the main stream of water. To this end, the calcium chloride fluoride, in a finely-divided state, is mixed with water in a proportion far exceeding its solubility limit, thereby producing an aqueous suspension of gelatinous calcium fluoride. The proportion of calcium chloride fluoride may be as high as is consistent with making a readily flowable suspension, and is conveniently at least 0.1 per cent by weight, preferably about 0.4 per cent. This preconcentrate is then mixed into the main stream of potable water in such proportion that the concentration of fluoride ion does not exceed about two parts per million. Best results are obtained when the preconcentrate is made up continuously just before use and is mixed into the main body of water while the calcium fluoride is still in the gelatinous non-settling stage. To this end the mixing may take place within ten minutes of the preparation of the preconcentrate.

Conveniently, the preconcentrate is formed in a slurry tank provided with an agitator, to which water and calcium chloride fluoride are added in controlled proportions by mechanical means. The resulting suspension is then mixed into the main stream of potable water by conventional liquid dosing equipment.

What is claimed is:

1. An improved method of introducing fluoride into potable water which comprises forming a preconcentrate by mixing finely-divided solid calcium chloride fluoride with water in a proportion exceeding its solubility limit to produce a suspension containing calcium fluoride in a form readily soluble in added water, and thereafter mixing the preconcentrate into the potable water in such proportion that the concentration of fluoride ion does not exceed two parts per million.

2. A method according to claim 1 wherein the preconcentrate is mixed with the main body of water within ten minutes of the preparation of the preconcentrate.

3. An improved method of introducing fluoride into potable water which comprises mixing finely-divided solid calcium chloride fluoride with water in a proportion of at least 0.1 per cent by weight to produce an aqueous suspension containing calcium fluoride in a form rapidly soluble in added water, and thereafter mixing the suspension into the potable water in such proportion that the concentration of fluoride ion does not exceed two parts per million, such latter mixing being carried out within ten minutes of the preparation of the suspension.

RAYMOND J. ANDERSON.

References Cited in the file of this patent

UNITED STATES PATENTS

| Number | Name | Date |
|---|---|---|
| 2,043,705 | Meinzer | June 9, 1936 |
| 2,072,376 | McKee et al. | Mar. 2, 1937 |

OTHER REFERENCES

Trans. Faraday Society, vol. 35, pages 241–6, 1939.

Journal Amer. Water Works Association, vol. 35, pages 1191–7, 1943.

Compt. rendus, vol. 138, pages 197–199, 1904.

Kolloid-Zeitschrift, 62, 1933, pages 131–133.

Inorganic and Theoretical Chemistry, by Mellor, vol. III, page 718, 1923.